UNITED STATES PATENT OFFICE.

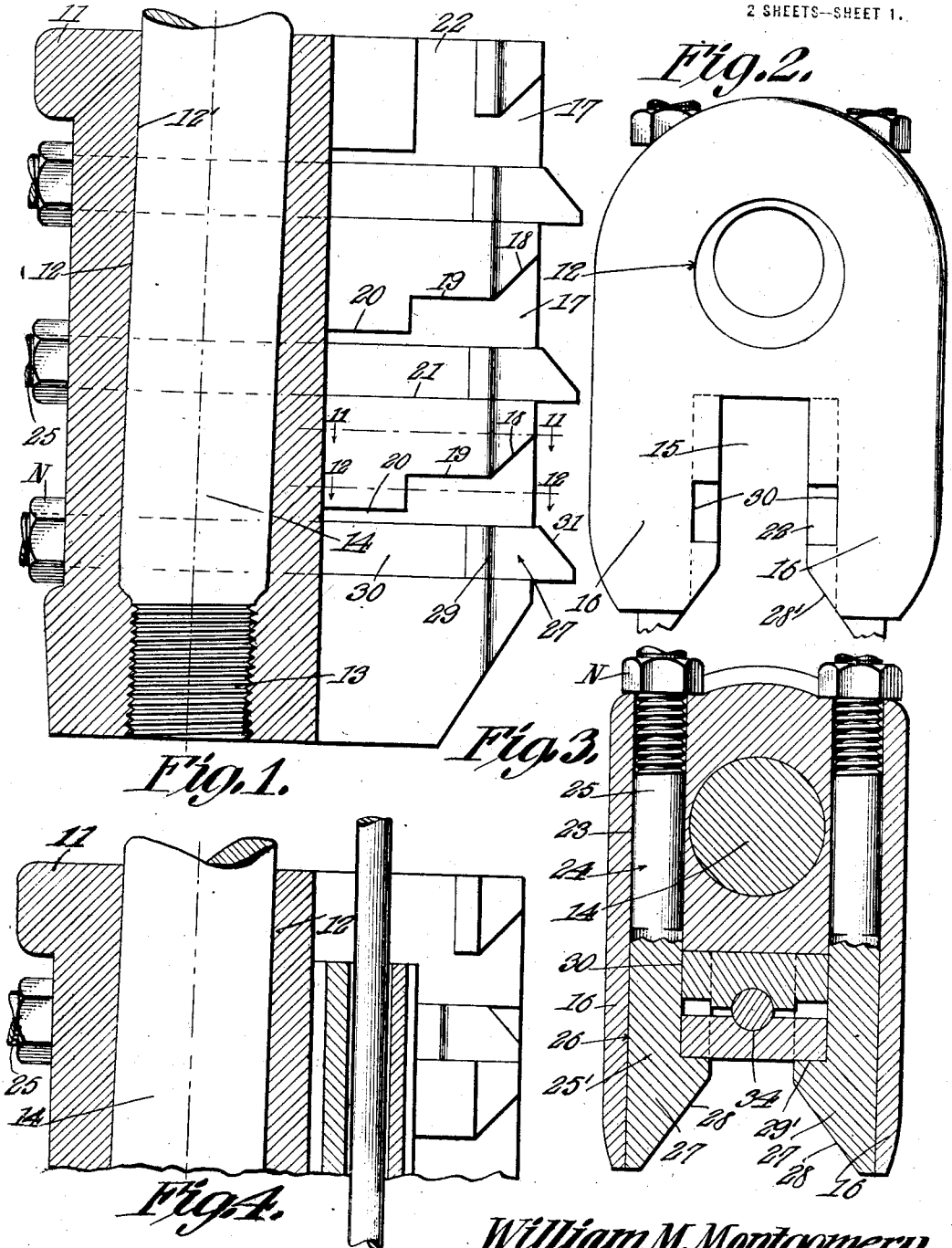

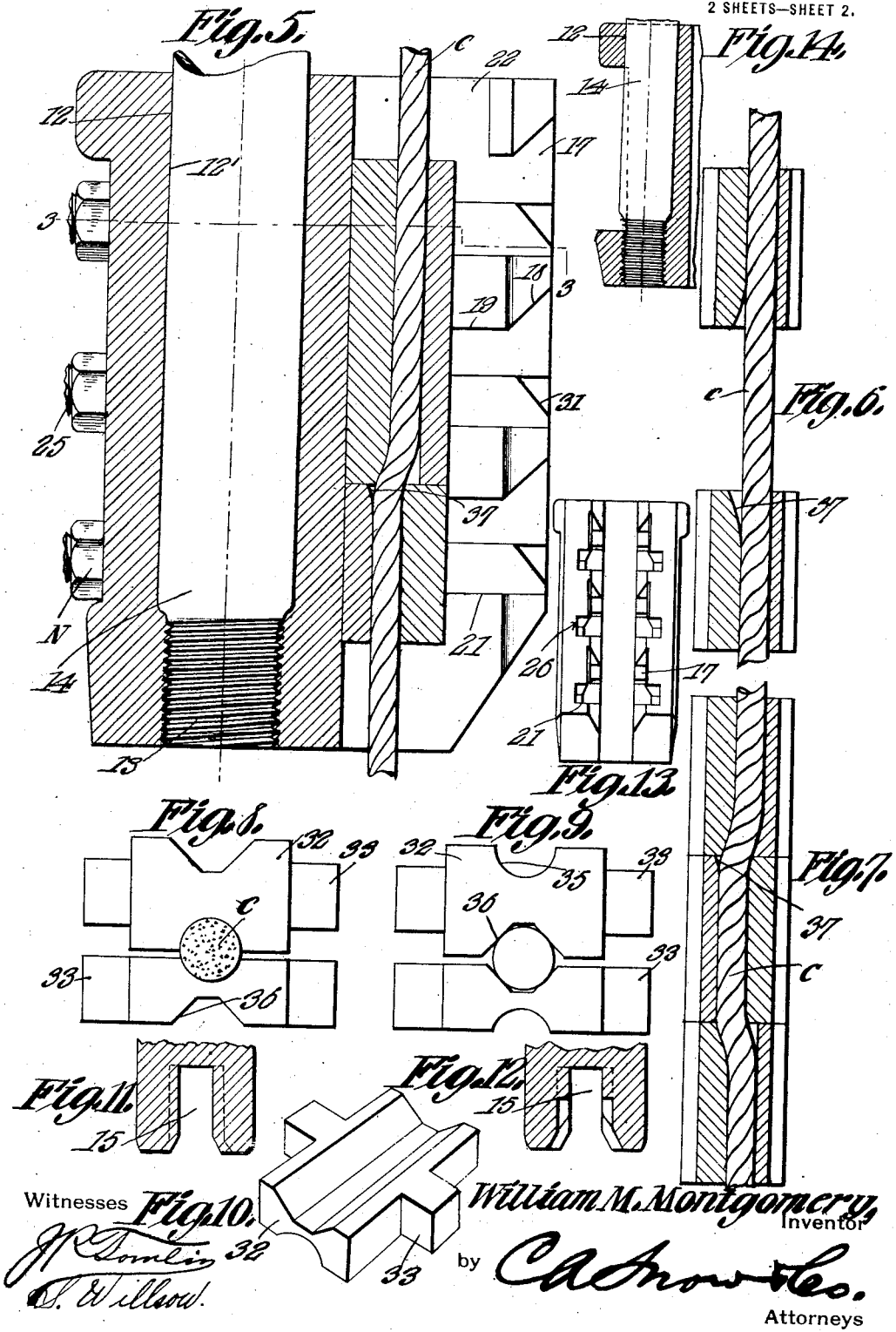

WILLIAM M. MONTGOMERY, OF SALEM, WEST VIRGINIA.

CONNECTING-ROD ATTACHMENT.

1,265,235.  Specification of Letters Patent.  Patented May 7, 1918.

Application filed June 24, 1914. Serial No. 847,090.

*To all whom it may concern:*

Be it known that I, WILLIAM M. MONTGOMERY, a citizen of the United States, residing at Salem, in the county of Harrison and State of West Virginia, have invented a new and useful Connecting-Rod Attachment, of which the following is a specification.

This invention relates to a coupling clamp and more particularly to one which is adapted to rigidly engage a connecting rod and to rigidly secure thereto a wire cable, or polish rod.

The object of the present invention is to provide an attachment adapted to rigidly engage the extremity of the connecting rod, and having novel means for the effective attachment of a wire cable or the polish rod thereto.

A further object is to provide a rigid member for the rigid securement of a cable to a connecting rod and due to the rigidity of the member, allows it to be used to clamp the polish rod and connecting rod and provides for their relative adjustment.

A further object is to provide a connecting rod attachment with outstanding clamping means which are adapted to engage a cable in a novel and efficacious manner and which clamping means is equally efficient in adjustably engaging the polish rod.

A further object is to provide an attachment for a connecting rod, the connecting rod being one such as used in connection with the walking beam of an oil well or pumping mechanism and which allows a wire cable or a polish rod to be readily secured thereto and quickly and easily detached therefrom.

Another object is to provide a clamp with a bore extending obliquely therethrough and which bore receives a connecting rod therein and engages the same at its lower extremity only. The foregoing provides that the clamp is rigidly secured to the lower extremity of the connecting rod at the lower extremity of the clamp bore, while the upper portions of the bore act in the capacity of a brace reinforcing and supporting connecting rod.

A slot extends through the clamp at an angle to the connecting rod and is adapted to engage a wire cable or polish rod and the obliquity of the connecting rod with relation to the slot provides that the wire cable or polish rod will be disposed directly below the cross head of the connecting rod.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention has been illustrated, in which:—

Figure 1 is a side view of the attachment in longitudinal section.

Fig. 2 is an end view thereof.

Fig. 3 is a cross sectional view taken on the line 3—3 of Fig. 5.

Fig. 4 is a fragmental view in section, illustrating the manner in which a polish rod is engaged by the clamping portion of the attachment.

Fig. 5 is a view similar to Fig. 1 with a cable passing through the clamping portion of the device.

Figs. 6 and 7 illustrate the manner in which the gripping blocks which are disposed within the clamps may engage the cable for its positive and rigid securement.

Fig. 8 is a detail view of a pair of reversible clamping or gripping blocks.

Fig. 9 is a similar view in which the blocks have been reversed and a polish rod is engaged thereby.

Fig. 10 is a view in perspective of one of the gripping blocks.

Fig. 11 is a fragmental view in section taken on the line 11—11 of Fig. 1.

Fig. 12 is a fragmental view in section taken on the line 12—12 of Fig. 1.

Fig. 13 is a reduced view in front elevation of the device.

Fig. 14 is a fragmental view of the clamp, in which a portion thereof has been omitted for the purpose of lightening the entire construction.

Referring to the drawings in which similar reference numerals designate corresponding parts throughout the several views, the present attachment includes the body 11 through which extends the bore 12. The bore 12 is substantially cylindrical at its upper portion as at 12′ but is reduced at its lower threaded portion as at 13, for the threaded securement of the connecting rod 14 thereto.

The body portion 11 is provided with the slot 15 extending the entire length thereof, the bottom wall of which extends at an angle to the axial line of the bore 12. The slot 15 provides the body 11 of the device with two forwardly extending projections 16 which are spaced a distance apart and adapted to receive suitable gripping blocks therebetween. The side walls of the slot are provided with a plurality of grooves 17 extending thereacross. Each groove 17 has one side wall formed with the outer beveled portion 18, the intermediate wall 19, and the end and offset wall 20. The opposite wall of the groove 21 is a plane surface extending substantially at right angles to the bottom of the slot 15. Thus it will be apparent that the width of the groove changes and narrows by steps toward its lower extremity. The depth of the groove, however, remains constant as is apparent from a reference to Figs. 11 and 12.

The various grooves 17 may be considered as formed by a plurality of outstanding semi-partitions P of the configuration described. The end groove 17 is provided with the entrance passageway 22 communicating therewith which allows the clamping blocks to be positioned within the groove 17 either by entrance through the passageway 22 or through the outer extremity defined by the beveled wall 18 and opposite and plane wall 21. Extending transversely through the body portion are the apertures 23 which receive the clamping bolts 24 therein. These clamping bolts each include the rounded and threaded shank 25 which shanks project through the body portion and are provided with the locking nuts positioned thereon. The lower extremity of the shank is squared as at 25′ and which slidably and non-rotatably engages the squared portion 26 of the apertures 23. The lower extremity of the bolt is provided with the enlarged head 27, the same being provided with the outwardly beveled end 28 and the sharply defined ledge 29. In this connection it is to be noted that the outer portions of the walls of the slot 15 are beveled as at 28′ along an angle similar to the angle of the bevel 28 of the bolt head. The apertures 23 are so arranged that the outer surfaces 30 of the bolts are substantially coplanar with the lower surfaces of the grooves 17. Thus the grooves 17 are provided with continuous bottom surfaces.

The extreme ends of the bolt heads are beveled in a transevrse manner as at 31 corresponding but reverse with respect to the beveled wall 18 of the grooves. Thus the grooves are provided with flared or enlarged mouths providing for the ready insertion of the lugs of the gripping blocks therein. The clamping or gripping blocks are each formed with a substantially rectangular body portion 32 from which project the outstanding lugs 33. The lugs 33 are of such size and spacing as to fit within the grooves 17 passing through the flared mouths thereof down between the bolt heads and the walls 19. The block is then moved longitudinally of the slot with the result that the lugs are positioned beneath the ledges 29. With the lugs so positioned, the blocks may then be pressed inwardly against the bottom wall of the slot 15 and the lugs held against shifting between the walls 21 and 20 of the grooves. The gripping or clamping blocks are arranged in pairs one upon the other and are each provided with the grooves 34 extending longitudinally therealong. The grooves may be of semi-cylindrical form as at 35 in Fig. 9, or semi-polygonal as illustrated at 36 in the said figure. The blocks of each pair are of slightly different thicknesses so that they may be arranged with the alternating thickened portions innermost, as illustrated in Fig. 7, in which the groove defined between the meeting faces of the blocks will be a broken line and thus adapted to efficiently grip a cable or allied flexible element. In this connection it is noted that the bloocks which are to be so arranged are slightly beveled as at 37 at their extremities, thus preventing a too sharp bend or kink in the cable which would tend to cut and fracture the various strands of which the cable is formed. The blocks are of different lengths and are thus sectional and are selected according to the object to be gripped.

In Fig. 5, a long and short pair of clamping blocks has been disposed within the slot 15 and are drawn into rigid engagement with the cable C by turning the nut ends which draw the bolt inwardly so that the ledges 29 contacting with the outstanding lugs 33 draw the blocks of each pair into forcible engagement with the cable. In this manner the cable may be adjusted longitudinally of the block by loosening the nut end and afterward again rigidly gripped in its new and adjusted position. The clamping blocks illustrated in Figs. 8 and 9 are reversible, each block being provided with two grooves, the grooves 35 being employed when a cable is to be gripped, and the polygonal grooves 36 being utilized to engage a polish rod.

The obliquity of the bore 12 taken with relation to the slot 15, provides that there will be a constant tendency for the clamp to swing beneath the connecting rod cross head. Thus the polish rod or wire cable is held in front of the connecting rod and in such manner that it may be easily and quickly detached from the device or merely adjusted, as the occasion may warrant. The swinging of the clamp beneath the cross head brings the polish rod or wire cable into direct alinement with the cross head, thus materially aiding in the proper operation of the apparatus with which the clamp is used. The stiff and rigid connection thus obtained between the connecting rod and the wire cable, prevents the cable from buckling. The rigidity of the attachment also allows it to be used to connect a polish rod in an adjustable manner to the connecting rod. The clamping bolts draw the two sections of each pair of clamping blocks together so as to rigidly grip any object which may be at that time interposed therebetween.

The securement between the connecting rod 14 and the body 11 takes place at the lower extremity of the latter and at a point immediately adjacent the connection between the clamping blocks and wire cable C. The upper extremity of the bore 12' acts in the capacity of a sleeve and takes up the side strains brought to bear upon the body 11. This action becomes more apparent by referring to Fig. 14 wherein the outer wall of the bore 12' has been removed intermediate the ends thereof which lightens the entire device and insures a more economic construction.

Having thus fully described my invention, what I claim is:—

1. A coupling clamp of the character described, comprising a rigid vertical clamp body having means below its center of gravity for the attachment of the lower end of a connecting rod and having means above said means for embracing the connecting rod, and means for clamping a cable or polish rod rigidly at one side of said body.

2. A coupling clamp of the character described, comprising a rigid clamp body having a longitudinal bore for snugly receiving one end portion of a connecting rod, and having a longitudinal channel at one side, the lower end of the bore being threaded for the engagement of the threaded end of the connecting rod, and means for clamping a cable or polish rod within said channel.

3. A coupling clamp comprising a body having means for the rigid attachment of a connecting rod and having a longitudinal channel at one side, the body having transverse grooves at the sides of the channel, members slidable through the body and arranged at the bottoms of the grooves, blocks disposed within the channel and having lugs engaging the grooves, the blocks being adapted to clamp a polish rod or cable, said slidable members having portions engaging certain lugs to hold the blocks within the channel, and nuts threaded upon said slidable members and bearing against that side of the body remote from the channel.

4. A coupling clamp comprising a body having means for the rigid attachment thereto of a connecting rod and having a longitudinal channel at one side, the body having a pair of transverse grooves at the sides of the channel, a pair of clamping blocks disposed within the channel and having lugs engaging said grooves, one clamping block resting against the bottom of the channel, and means carried by the body and engageable with the other block for moving it toward the first mentioned block for clamping a cable or polish rod therebetween.

5. A coupling clamp comprising a body having means for the rigid attachment thereto of a connecting rod, and having a longitudinal channel at one side, said body having a plurality of pairs of transverse grooves at the sides of the channel, spaced pairs of clamping blocks disposed within the channel and having lugs engaging the respective grooves, one block of each pair resting against the bottom of the channel, and means carried by the body and engageable with other blocks for moving them toward the bottom of the channel, said blocks being removable and of different thicknesses, and said blocks being adapted to be interchanged with one another to provide either a straight or tortuous passage through the pairs of blocks.

6. A coupling clamp comprising a body for the rigid attachment thereto of a connecting rod and having a longitudinal channel at one side, said body having a pair of transverse grooves at the sides of the channel, a pair of clamping blocks disposed within the channel and having lugs engaging the respective grooves, one clamping block resting against the bottom of the channel, and means carried by the body and engageable with the other block for moving it toward the bottom of the channel, said blocks being reversible and each having a curved recess at one side and an angular recess at its opposite side.

7. A coupling clamp comprising a rigid one-part vertical clamp body having vertical means at one side for the rigid attachment thereto of the lower terminal of a depending connecting rod, and vertical means at another side of said body for rigidly clamping a cable.

In testimony that I claim the foregoing as my own, I have hereto affixed my signature in the presence of two witnesses.

WILLIAM M. MONTGOMERY.

Witnesses:
H. J. Cross,
K. V. Davis.